US009135691B2

(12) United States Patent
Knight et al.

(10) Patent No.: US 9,135,691 B2
(45) Date of Patent: Sep. 15, 2015

(54) METALLOGRAPHIC METHOD FOR ACCURATE MEASUREMENT OF PORE SIZES AND DISTRIBUTIONS IN METAL CASTINGS

(71) Applicant: GM Global Technology Operations LLC, Detroit, MI (US)

(72) Inventors: James W. Knight, Davison, MI (US); Qigui Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 215 days.

(21) Appl. No.: 13/891,235

(22) Filed: May 10, 2013

(65) Prior Publication Data

US 2013/0336576 A1    Dec. 19, 2013

Related U.S. Application Data

(60) Provisional application No. 61/661,502, filed on Jun. 19, 2012.

(51) Int. Cl.
| | | |
|---|---|---|
| G06K 9/00 | (2006.01) | |
| G06T 7/00 | (2006.01) | |
| G06T 7/40 | (2006.01) | |

(52) U.S. Cl.
CPC ............... *G06T 7/0004* (2013.01); *G06T 7/401* (2013.01); *G06T 2207/10061* (2013.01); *G06T 2207/30116* (2013.01)

(58) Field of Classification Search
USPC ....................................................... 382/152
See application file for complete search history.

(56) References Cited

U.S. PATENT DOCUMENTS 6,568,282 B1 * 5/2003 Ganzi ..................... 73/861.42
7,024,342 B1 * 4/2006 Waite et al. .................. 703/6

OTHER PUBLICATIONS

"Image Analysis", Oct. 1996, Retrieved from Internet. Retrieved from URL:<http://www.umanitoba.ca/science/geological_sciences/labs/microbeam/ibas.html>.*
Kumari, "Influence of alloying additions on the structure and properties of Al 7Si 0 3Mg Alloy", 2006, Retrieved on Mar. 31, 2015 from URL:<http://shodhganga.inflibnet.ac.in/bitstream/10603/5992/7/07_chapter%202-3.pdf>.*

(Continued)

*Primary Examiner* — Gregory F Cunningham
(74) *Attorney, Agent, or Firm* — Dinsmore & Shohl LLP

(57) ABSTRACT

A quantitative metallographic method to measure pore sizes and pore distributions in cast aluminum components. An image of a location of interest in a cast component sample is first obtained using an image analyzer. Spacing criteria, such as a measure of the secondary dendrite arm spacing, may be used with the received image to provide evidence of pore clustering. This allows the system to performing calculations to determine if multiple pores can be clustered or grouped together as a single pore in three-dimensional space. From this, the total area of the pores in each of these groups or clusters is calculated and used as a representation of the pore area for that cluster. In general, pore size and pore distribution measurements in cast components achieved by the present invention show accurate predictions of pore size and spacing, and in particular evidence a reduced tendency to under-predict the size and distribution of actual pores.

5 Claims, 7 Drawing Sheets

(56) References Cited

OTHER PUBLICATIONS

Berry et al., "The Effect of Applied Pressure During Feeding of Critical Cast Aluminum Alloy Components With Particular Reference to Fatigue Resistance", Jun. 2003, Retrieved on Mar. 31, 2015, retrieved from URL:<www.osti.gov/servlets/purl/813487/>.*

Xiaoxia Zhu, "Ultrasonic Fatigue of E319 Cast Aluminum Alloy in the Long Lifetime Regime", 2007, Retrieved on Mar. 31, 2015, from Internet URL:<deepblue.lib.umich.edu/.../zhux_1.pdf>.*

Boromei et al., "Influence of the solidification microstructure and porosity on a fatique strength of Al—Si—Mg casting alloys", 2010, Retrieved from Internet on Mar. 31, 2015 from URL:<http://www.gruppofrattura.it/ors/index.ph/MST/article/view/1148/1100>.*

Boileau, James M., The Effect of Solidification Time on the Mechanical Properties of a Cast 319 Aluminum Alloy, Thesis Book, Materials Science and Engineering, Graduate School of Wayne State University, 2000, pp. ii, v-xvii, 14-17, USA.

* cited by examiner

| | Area | Length | Sphericity | XCent | YCent | Perimeter | FldNo | ObjId | | Cat |
|---|---|---|---|---|---|---|---|---|---|---|
| 1 | 73418.4 | 443.6 | 0.3 | 1464.7 | -526.2 | 1847.4 | 1 | 2 | | 5 |
| 2 | 39631.9 | 328.7 | 0.3 | 2832.5 | -3070.7 | 1308.7 | 1 | 24 | | 5 |
| 3 | 19167.5 | 214.5 | 0.4 | 75.9 | -112.6 | 807.7 | 1 | 1 | | 5 |
| 4 | 19479.3 | 208.1 | 0.3 | 1794.5 | -2424.1 | 841.3 | 1 | 14 | | 5 |
| 5 | 926.9 | 69.2 | 0.4 | 479.1 | -2475.1 | 163.6 | 1 | 15 | | 5 |
| 6 | 2340.3 | 67.1 | 0.5 | 3742.1 | -1734.3 | 246.2 | 1 | 12 | | 5 |
| 7 | 1086.2 | 59.4 | 0.6 | 480.4 | -2726.4 | 146.9 | 1 | 21 | | 5 |
| 8 | 442 | 38.9 | 0.7 | 670.2 | -2547.1 | 91.1 | 1 | 19 | | 5 |
| 9 | 383.8 | 33.9 | 0.8 | 170.2 | -1557.6 | 78.9 | 1 | 10 | | 5 |
| 10 | 387.2 | 33.4 | 0.7 | 676.7 | -2503.9 | 86.3 | 1 | 16 | | 5 |
| 11 | 519.1 | 33.4 | 0.7 | 3509.2 | -3094.2 | 99.9 | 1 | 25 | | 5 |
| 12 | 388.9 | 33.2 | 0.8 | 2526.2 | -2911 | 80.5 | 1 | 22 | | 5 |
| 13 | 364.9 | 29.1 | 0.7 | 3802.4 | -416.2 | 78.9 | 1 | 4 | | 5 |
| 14 | 195.3 | 29.1 | 0.4 | 1594.2 | -2091.6 | 79.2 | 1 | 13 | | 5 |
| 15 | 327.2 | 27 | 0.9 | 2162.3 | -641.4 | 67.2 | 1 | 5 | | 5 |
| 16 | 326.9 | 24.9 | 0.9 | 3708.1 | -1646.6 | 67.7 | 1 | 11 | | 5 |
| 17 | 239.9 | 24.5 | 0.8 | 1566.8 | -820.7 | 59.6 | 1 | 7 | | 5 |
| 18 | 147.3 | 22.6 | 0.7 | 4123 | -2912.3 | 50.8 | 1 | 23 | | 5 |
| 19 | 250.1 | 21.9 | 1 | 663.6 | -2523.6 | 55 | 1 | 18 | | 5 |
| 20 | 128.5 | 20.9 | 0.8 | 2560.2 | -844.2 | 45.1 | 1 | 8 | | 5 |
| 21 | 183.3 | 17.7 | 0.9 | 641.4 | -2520.9 | 49.7 | 1 | 17 | | 5 |
| 22 | 89.1 | 15.4 | 0.9 | 4055 | -701.6 | 35.1 | 1 | 6 | | 5 |
| 23 | 92.5 | 14.1 | 1 | 3144 | -322 | 33.5 | 1 | 3 | | 5 |
| 24 | 104.5 | 13.6 | 1 | 697.6 | -2553.7 | 34.4 | 1 | 20 | | 5 |
| 25 | 92.5 | 13.3 | 1 | 2581.2 | -1417.5 | 33.8 | 1 | 9 | | 5 |
| 26 | 90.6 | 12.4 | 1 | 3051.0 | 3115.6 | 31.9 | 1 | 26 | | 5 |

FIG. 3

| Object # | Area μm² | Length μm | Sphericity | Perimeter μm | Radius μm | Pore to Pore μm | Cent. to Cent. μm | Pore to Sur μm | Dist to Sur μm |
|---|---|---|---|---|---|---|---|---|---|
| #2 | 73418.4 | 443.6 | 0.3 | 1847.4 | 152.9 | 150.1 | 311.7 | 373.3 | 526.2 |
| #24 | 39631.9 | 328.7 | 0.3 | 1308.7 | 112.3 | 67.7 | 185.4 | 2958.4 | 3070.7 |
| #1 | 19167.5 | 214.5 | 0.4 | 807.7 | 78.1 | 1218.0 | 1448.1 | 34.5 | 112.6 |
| #14 | 19479.3 | 208.1 | 0.3 | 841.3 | 78.7 | 301.5 | 388.1 | 2345.3 | 2424.1 |
| #15 | 926.9 | 69.2 | 0.4 | 163.6 | 17.2 | 143.8 | 168.6 | 2458.0 | 2475.1 |
| #12 | 2340.3 | 67.1 | 0.5 | 246.2 | 27.3 | 56.5 | 94.1 | 1707.0 | 1734.3 |
| #21 | 1086.2 | 59.4 | 0.6 | 146.9 | 18.6 | 215.5 | 251.3 | 2707.8 | 2726.4 |
| #19 | 442.0 | 38.9 | 0.7 | 91.1 | 11.9 | 3.7 | 24.5 | 2535.3 | 2547.1 |
| #10 | 383.8 | 33.9 | 0.8 | 78.9 | 11.1 | 939.9 | 968.1 | 1546.5 | 1557.6 |
| #16 | 387.2 | 33.4 | 0.7 | 86.3 | 11.1 | 3.6 | 23.6 | 2492.8 | 2503.9 |
| #25 | 519.1 | 33.4 | 0.7 | 99.9 | 12.9 | 551.9 | 640.3 | 3081.4 | 3094.2 |
| #22 | 388.9 | 33.2 | 0.8 | 80.5 | 11.1 | 221.0 | 237.5 | 2899.9 | 2911.0 |
| #4 | 364.9 | 29.1 | 0.7 | 78.9 | 10.8 | 365.0 | 381.1 | 405.5 | 416.2 |
| #13 | 195.3 | 29.1 | 0.4 | 79.2 | 7.9 | 301.5 | 388.1 | 2083.7 | 2091.6 |
| #5 | 327.2 | 27.0 | 0.9 | 67.2 | 10.2 | 430.0 | 446.6 | 631.2 | 641.4 |
| #11 | 328.9 | 24.9 | 0.9 | 67.7 | 10.2 | 56.5 | 94.1 | 1636.4 | 1646.6 |
| #7 | 239.9 | 24.5 | 0.8 | 59.6 | 8.7 | 150.1 | 311.7 | 811.9 | 820.7 |
| #23 | 147.3 | 22.6 | 0.7 | 50.8 | 6.8 | 620.6 | 640.3 | 2905.5 | 2912.3 |
| #18 | 250.1 | 21.9 | 1.0 | 55.0 | 8.9 | 3.6 | 22.4 | 2514.6 | 2523.6 |
| #8 | 128.5 | 20.9 | 0.8 | 45.1 | 6.4 | 430.0 | 446.6 | 837.8 | 844.2 |
| #17 | 183.3 | 17.7 | 0.9 | 49.7 | 7.6 | 5.8 | 22.4 | 2513.3 | 2520.9 |
| #6 | 89.1 | 15.4 | 0.9 | 35.1 | 5.3 | 365.0 | 381.1 | 696.2 | 701.6 |
| #3 | 92.5 | 14.1 | 1.0 | 33.5 | 5.4 | 648.9 | 665.1 | 316.6 | 322.0 |
| #20 | 104.5 | 13.6 | 1.0 | 34.4 | 5.8 | 10.6 | 28.3 | 2547.9 | 2553.7 |
| #9 | 92.5 | 13.3 | 1.0 | 33.8 | 5.4 | 561.9 | 573.7 | 1412.1 | 1417.5 |
| #26 | 90.8 | 12.4 | 1.0 | 33.9 | 5.4 | 67.7 | 185.4 | 3107.2 | 3112.6 |

FIG. 5

METALLOGRAPHIC METHOD FOR ACCURATE MEASUREMENT OF PORE SIZES AND DISTRIBUTIONS IN METAL CASTINGS

This application claims priority to U.S. Provisional Application 61/661,502, filed Jun. 19, 2012.

BACKGROUND OF THE INVENTION

This invention is related generally to the quantification of porosity distribution in metal castings, and in particular to an improved quantitative metallographic methodology to accurately measure porosity and its distribution in cast components.

Porosity has long been recognized as an important detrimental factor affecting mechanical properties of casting components. The larger the pores, the lower the mechanical properties, where fatigue resistance has been shown to be particularly susceptible. Porosity location is also problematic, as for the same pore size, fatigue life is lower when the porosity is located closer to the stressed free surface. Aluminum and aluminum alloy castings—which are useful in automotive components such as engine blocks and related structures—are especially vulnerable to porosity.

In practice, porosity is commonly measured metallographically on as-polished planes, where fractographic measurements are usually conducted in a scanning electron microscope (SEM) on the fracture surfaces of such planed specimens. In one form, the measurement data is useful in daily casting operations for quality control, as well as for fatigue and other mechanical property predictions. It has been found that there is a significant difference between pore sizes measured on as-polished planes and the actual size of fracture surfaces in three dimensional (3D) space, where typically the pore size measured on an as-polished plane is the smaller of the two, often significantly so.

One reason for the difference between the traditional metallographic measurements and actual pore sizes in 3D can be attributed to the way in which the data from the metallographic image analysis (IA) or related computerized vision system is acquired and analyzed. Traditionally, the pore sizes measured on the as-polished planes are performed on a field-by-field basis, where the actual field size depends on camera resolution and magnification used. In many cases, a single pore can be located on the boundaries of several fields. As a result, some pores are partially measured in multiple fields of view which can result in the aforementioned under-measurement of the pore size. Another reason for the difference between the traditional metallographic measurements and actual pore sizes in 3D can be explained by the irregular-shaped pores that are measured when a two-dimensional (2D) plane is sectioned through an irregularly-shaped pore; in such circumstances, a single pore can be observed as several individual small pores on the section plane. Therefore, the ability of traditional metallographic measurements to provide accurate quantitative pore data is severely hampered. Concomitantly, to take such information and use it as input to a mathematical model (such as a fracture mechanics model) as a way to predict fatigue performance of the material will likely result in inaccuracies, especially in its tendency drastically overestimate the fatigue strength and the available life of the casting.

One alternative to provide quantitative pore data is through micro-focused X-ray computed tomography (CT); unfortunately, such an approach is expensive and time-consuming, and therefore not suited to a production-oriented environment. Another alternative includes the computational simulation and prediction of porosity; however, simplifying assumptions in the physics and complex casting process to enable the calculations and to reduce computational cost can result in relatively poor approximations of actual pore size.

SUMMARY OF THE INVENTION

The present inventors have determined that an accurate quantitative understanding of pores and related defects is crucial to developing manufacturing processes that would lead to improved microstructures and related reliability in cast metal products. To that end, they have developed a new metallographic method to measure pore sizes in cast metal components in general, and cast aluminum components in particular. With this invention, it will be possible to provide more accurate measurements of pore sizes and distributions in cast components not only for product quality control but also for product performance and durability analysis that can be subsequently used to improve casting process operations.

According to a first aspect of the present invention, a method of determining pore size and distribution in a metal casting is disclosed. The method includes receiving an image (or multiple images) of a location of interest in a metal casting sample or specimen. In one form, the image comprises a large mosaic of various fields that make up the specimen. The method is used to accurately measure 3D sizes and distributions of pores—particularly for those with irregular shape in 3D using conventional 2D image analyzer equipment.

BRIEF DESCRIPTION OF THE DRAWINGS

The following detailed description of the preferred embodiments of the present invention can be best understood when read in conjunction with the following drawings, where like structure is indicated with like reference numerals and in which:

FIG. 3 shows representative measured data from a 2-by-2 mosaic analysis of a notional area of an aluminum alloy casting sample;

FIG. 5 shows calculated pore spacings for the data from FIGS. 3 and 4;

DETAILED DESCRIPTION OF THE PREFERRED EMBODIMENTS

Because of its tendency to exhibit good castability, pressure tightness and weldability, coupled with reasonable strength and relatively high tolerance to impurities, alloy 319 aluminum has been a popular choice for permanent mold castings and sand castings as a way to make numerous automotive components. Although much of the subsequent discussion is based on analysis that the present inventors conducted on alloy 319 aluminum, it will be appreciated by those skilled in the art that the applicability of the present methods to other aluminum alloys is deemed to be within the scope of the present invention.

Recourse is also made to secondary dendrite arm spacing (SDAS) and its applicability to measurements made according to the present invention. In general, SDAS is a measure of the fineness of a cast aluminum alloy microstructure, which in turn may depend from the cooling rates used on the casting. Moreover, the SDAS value can—among other things—provide indicia of pore clustering that is useful in determining size and distribution with greater accuracy. Within the context of the present invention, pores are considered as being clustered together when an interpore spacing of fewer than five SDAS (or more preferably fewer than two SDAS) is in evidence; in such circumstances, the pores are considered to belong to one single pore in 3D space. From this, the total area of the pores in each of these groups or clusters is considered as the pore area for that cluster. Furthermore, the largest distance between pore outer edges in each of these groups is considered to be the largest Feret diameter (i.e., a measure of a pore size along a particular direction, typically as the distance between the two parallel planes that bound the pore object perpendicular to that direction) of the cluster that is useful in analyze 3D projections of the pore onto a 2D plane. Likewise, the absolute value of the smallest distance from the outer edge of one of the pores or pore cluster to the outer edge of another pore or cluster is deemed to be the pore spacing, while the absolute value of the smallest distance of the outer edge of the pore or cluster to the casting free surface is deemed to be the distance to the surface of the sample. More detail associated with pore clusters is provided below.

Figure 1:
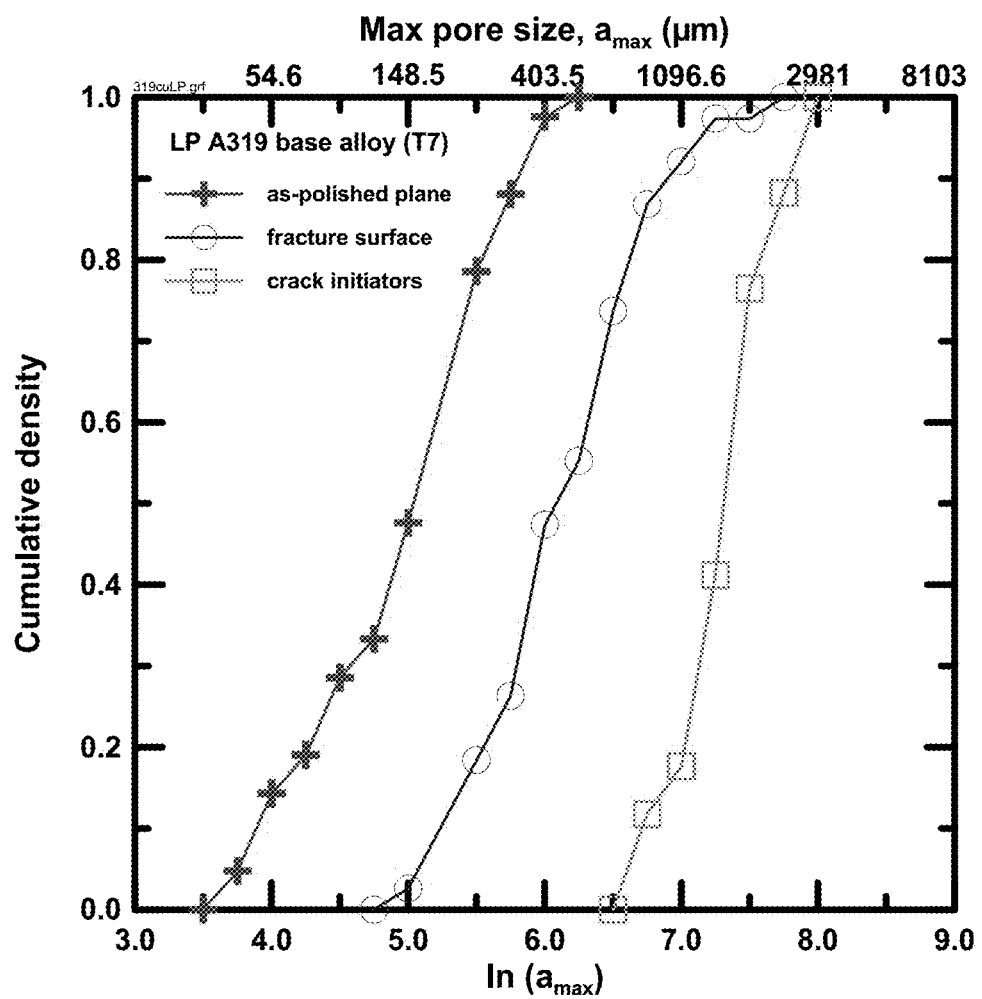
FIG. 1 shows a comparison of maximum pore sizes as measured on as-polished planes under the traditional metallographic approach according to the prior art and actual 3D fracture surface sizes for a low pressure lost foam casting for a 319 aluminum alloy.
Figure 2A:
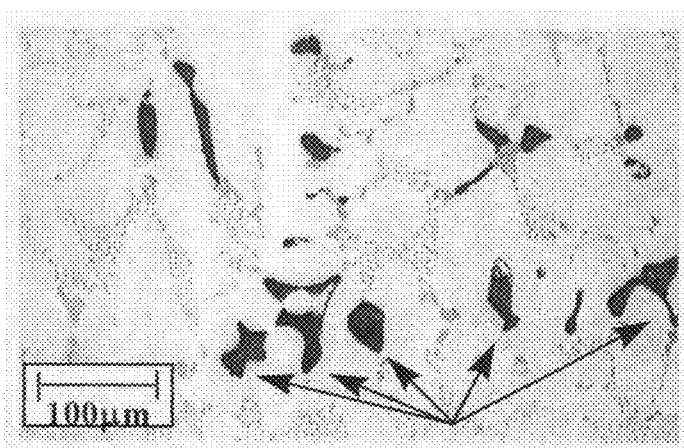
FIG. 2A shows a cutaway surface from an alloy 319 aluminum casting.
Figure 2B:
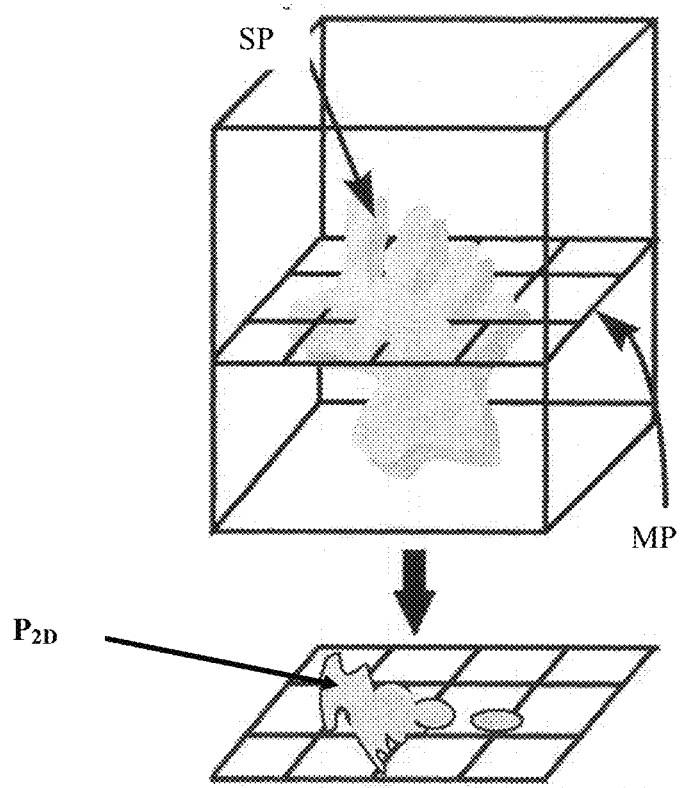
FIG. 2B shows a metallographic representation of the casting of FIG. 2A.

Referring first to FIGS. 1, 2A and 2B, pore size and distribution observed on the fracture surfaces of a conventional metallographic specimen of alloy 319 aluminum are often significantly different than those of their measured equivalents in typical 2D metallography. In particular, the actual sizes of the pores are often two to five times larger than those observed on the metallographic planes, regardless of the alloy and casting process. Furthermore, pores located in the fatigue crack initiation sites are even larger (two to three times) than those observed in other areas of the fracture surfaces, indicating that the largest pores may be where the fatigue cracks are initiated. Because of this, the concern is that under-measuring the porosity and other discontinuities in the materials that are believed to be responsible for starting cracks can significantly hamper the accuracy of a subsequent fatigue prediction. Referring with particularity to FIG. 2B and as mentioned above, a 2D plane section taken through a random metallographic plane MP of an irregular shape pore (shown particularly as shrinkage pore SP) tends to be viewed on the section plane as several individual small pores $P_{2D}$. This tendency (as shown in the lower portion of FIG. 2B)—which can also be seen in the actual alloy 319 cutaway image in FIG. 2A—has been discussed in the literature, an example of which is James M. Boileau, *The Effect of Solidification Time on the Mechanical Properties of a Cast* 319 *Aluminum Alloy*, PhD Dissertation, Wayne State University (2000). In the present disclosure, pore size may refer to a particular length, perimeter or area; the choice of one or the other will be readily apparent from the context.

Figure 4:
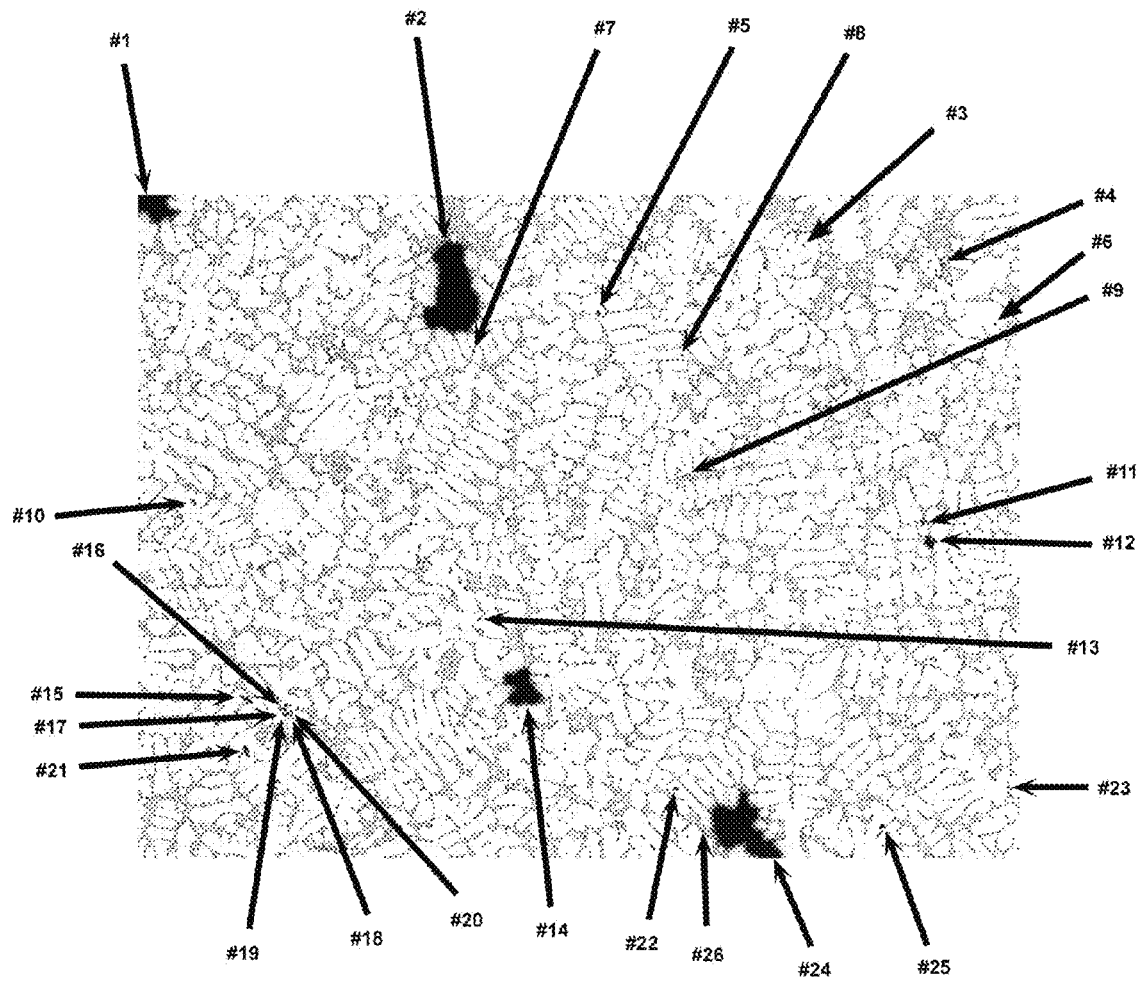
FIG. 4 shows a 2-by-2 mosaic image at a magnification factor of 50 corresponding to the measured data taken from the sample of FIG. 3 with twenty six of the measured objects identified.

Referring next to FIGS. 3 and 4, data and images corresponding to the quantitative measurement approach of an aspect of the present invention is shown and described. In one step, the volume percent of porosity and pore size are measured on a sample or specimen of the casting. To determine volume percent porosity and pore size, a mosaic image of the micrograph is obtained by conventional IA means, where the mosaic image is taken from the as-polished plane of the sample that is cut from the location of interest in the cast component. In a preferred form, the pores are automatically identified by an optical microscope or related mechanized device based on the gray level contrast between the pores and the material surrounding the pores. The IA will than accept these identified pores and measure them automatically. A notional table of such collected data for identified pores can be seen in FIG. 3, where the columns from left to right identify the pore number, pore area, pore length, pore sphericity, X-cent, Y-cent, pore perimeter, field number, Objld and Cat, respectively. In the table, sphericity is a measure of how spherical the pore is; thus, for a perfect pore, the sphericity is 1. X-cent is the X coordinate of the centroid point of the object, while Y-cent is the comparable Y coordinate. The field number is the ID of the image field observed in the IA, while Objld is the identifier that corresponds to each individually-measured pore. As shown with particularity in FIG. 4, twenty six individual pores were identified from the scanned image.

Figure 7:
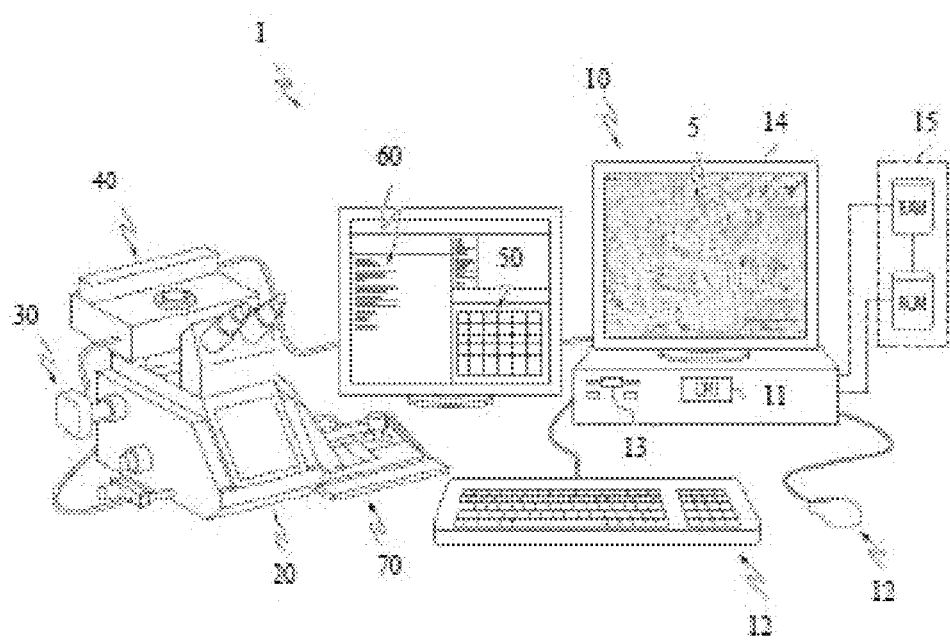
FIG. 7 shows a computerized IA that can be used to measure and quantify pore size and distribution according to an aspect of the present invention.

As mentioned above, in a preferred form, the program and analysis to provide quantitative measurement of casting porosity is configured to be performed on a digital computer or related electronic device, of which a computerized vision system like the IA system may be part of or otherwise cooperative with. Referring next to FIG. 7, computerized vision system 1 is configured to perform data gathering, analysis and manipulation necessary to quantify pore size and distribution. In addition to IA, system 1 may also be referred to through variants, such as an image analyzer system, image analysis system, image analyzer or the like. In situations where system 1 is computer-based in the manner discussed below (as well as suitable variants thereof), it is referred to as having a von Neumann architecture. Likewise, a particularly-adapted computer or computer-related data processing device that employs the salient features of a von Neumann architecture in order to perform at least some of the data acquisition, manipulation or related computational functions, is deemed to be compatible with the method of the present invention. It will be appreciated by those skilled in the art that computer-executable instructions that embody the calculations discussed above pertaining to measuring and calculating can be made to achieve the objectives set forth in the present invention.

System 1 includes a computer 10 or related data processing equipment that includes a processing unit 11 (which may be in the form of one or more microprocessors or related processing means), one or more mechanisms for information input 12 (including a keyboard, mouse or other device, such as a voice-recognition receiver (not shown)), as well as a one or more loaders 13 (which may be in the form of magnetic or optical memory or related storage in the form of CDs, DVDs, USB port or the like), one or more display screens or related information output 14, a memory 15 and computer-readable program code means (not shown) to process at least a portion of the received information relating to the aluminum alloy. As will be appreciated by those skilled in the art, memory 15 may be in the form of random-access memory (RAM, also called mass memory, which can be used for the temporary storage of data) and instruction-storing memory in the form of read-only memory (ROM). In addition to other forms of input not shown (such as through an internet or related connection to an outside source of data), the loaders 13 may serve as a way to load data or program instructions from one computer-usable medium (such as flash drives or the aforementioned CDs, DVDs or related media) to another (such as memory 15). As will be appreciated by those skilled in the art, computer 10 may exist as an autonomous (i.e., stand-alone) unit, or may be the part of a larger network such as those encountered in cloud computing, where various computation, software, data access and storage services may reside in disparate physical locations. Such a dissociation of the computational resources does not detract from such a system being categorized as a computer.

In a particular form, the computer-readable program code that contains the algorithms and formulae mentioned above can be loaded into ROM that is part of memory 15. Such computer-readable program code may also be formed as part of an article of manufacture such that the instructions contained in the code are situated on a magnetically-readable or optically-readable disk or other related non-transitory, machine-readable medium, such as flash memory device, CDs, DVDs, EEPROMs, floppy disks or other such medium capable of storing machine-executable instructions and data structures. Such a medium is capable of being accessed by computer 10 or other electronic device having processing unit 11 used for interpreting instructions from the computer-readable program code. Together, the processor 11 and any program code configured to be executed by the processor 11 define a means to perform one or more of the pore size and distribution calculations discussed herein. As will be understood by those skilled in the computer art, a computer 10 that forms a part of image analysis system 1 may additionally include additional chipsets, as well as a bus and related wiring for conveying data and related information between processing unit 11 and other devices (such as the aforementioned input, output and memory devices). Upon having the program code means loaded into ROM, the computer 10 of system 1 becomes a specific-purpose machine configured to determine an optimal cast component in a manner as described herein. In another aspect, system 1 may be just the instruction code (including that of the various program modules (not shown)), while in still another aspect, system 1 may include both the instruction code and a computer-readable medium such as mentioned above.

It will also be appreciated by those skilled in the art that there are other ways to receive data and related information besides the manual input approach depicted in input 12 (especially in situations where large amounts of data are being input), and that any conventional means for providing such data in order to allow processing unit 11 to operate on it is within the scope of the present invention. As such, input 12 may also be in the form of high-throughput data line (including the internet connection mentioned above) in order to accept large amounts of code, input data or other information into memory 15. The information output 14 is configured to convey information relating to the desired casting approach to a user (when, for example, the information output 14 is in the form of a screen as shown) or to another program or model. It will likewise be appreciated by those skilled in the art that the features associated with the input 12 and output 14 may be combined into a single functional unit such as a graphical user interface (GUI).

The IA system 1 is used to extract information from images 5, in particular, using metallographic techniques to acquire pore properties of the casting sample or specimen of interest. Starting with a prepared (for example, polished) metallographic sample, a microscope 20 or related scanner or visual acquisition device is used to magnify and display on output 14 the image 5 that is captured by the camera 30. Typically, many images 5 are captured through the use of a motorized stage 40 and stage pattern 50. Gray thresholding may then be performed on these digitized images 5 in a computer-based routine or algorithm 60 (shown in user-readable form on a display) that make up the image analysis software that may be stored in memory 15 or other suitable computer-readable medium. A stage controller 70 (which employs joy stick-like control) may be used to move the micrograph of the material sample from one field to another field in the microscope 20 through a three-dimensional (Cartesian) series of x, y and z (focus) stage movements. This allows movement across a stage pattern 50 to permit analyzing multiple fields of view over the sample. This automated stage pattern 50—which includes auto focus features—permits the capture of large amounts of data in a short period of time. The joy stick of stage controller 70 allows movement of the stage while observing the sample through the eyepiece of microscope 20 to facilitate the selection of particular areas that the analysis of the present invention will be performed on.

Referring again to FIGS. 3 and 4 in conjunction with FIG. 5, once the volume percent porosity and pore sizes are measured, the pore coordinates must be defined, where the x and y coordinates of each pore in a reference-frame such as that used in a Cartesian-based coordinate system may serve as a suitable way to establish such pore coordinates. In this way, coordinates corresponding to each measured or detected pore may be spatially defined relative to other pores within a common coordinate system, grid or other suitable reference frame. In one form, these measurements are made with respect to an origin established within the received image. For example, such an origin may be located at the right corner of the micrograph along the surface such that the x and y coordinates describe the pore feature location relative to that origin. By way of an example, in an end-chill cast plate, the distance from the chilled surface to the polished surface is measured as the z coordinate and is known as the distance from chilled surface. The y-coordinate obtained using the IA system 1 is then multiplied by −1 to obtain positive y-values, y', and the z-coordinate is simply the micrograph's height from the chilled end of the casting plate, making the coordinates are reported as x', y' and z. This defining the origin is helpful to ensure that the actual location of a pore in the image 5 of the casting sample is identified with specificity; once the coordinate origin is defined in the IA, the locations of pores measured in the sample/casting by the IA system 1 can be automatically determined by the machine based on these values (such as the XCent and YCent values identified in the table of FIG. 3).

Having determined the coordinates of the pores, pore spacing (such as through triangulation) is then measured. To determine whether the clustered individual pores in a particular 2D view belong to a single pore in actual 3D space, it is necessary to determine the distance (spacing) between the pores. Once the X and Y coordinates of two pores is known, the distance between them can be calculated using triangulation principle, where the distance between two pores is equal to the longest side length of a right triangle with two pores are assumed to locate at two points of the triangle based on their coordinates. In one form of the present invention, the inventors have created an algorithm capable of being stored on a computer-usable medium; this algorithm may be used in order to calculate various pore spacings, including (a) pore-to-pore, (b) pore-to-surface, (c) distance-to-surface and (d) centroid-to-centroid. In the algorithm, the centroid is defined as the point where the specimen is balanced. Thus, on such a location it would be possible to balance the specimen on the tip of a needle in a manner analogous to the center of gravity of a body being measured. The x and y centroid coordinates are reported and the distance to the nearest neighbor (centroid-to-centroid) is calculated from these coordinates as well as the distance to the nearest neighbor minus the equivalent circular radius of the two features (pore-to-pore), where the equivalent circular radius is the radius of a circle with the same area as the feature measured. Likewise, the distance of the centroid from the cast surface minus the equivalent circular radius (pore-to-surface) and the distance of the centroid from the cast surface (distance-to-surface) are also indicated. The calculations performed are as follows:

$$A^2+B^2=C^2$$

$$\sqrt{(A^2+B^2)}=C$$

$$A=X_1-X_2$$

$$B=Y_1-Y_2$$

$$\sqrt{[(X_1-X_2)^2+(Y_1-Y_2)^2]}=C$$

where C equals the centroid-to-centroid pore spacing and the centroid distance minus the radius of the pores equals the pore-to-pore spacing. In the above equations, A and B represent the lengths of the short sides of a right triangle (i.e., triangulation factors), while C represents the length of the longest side; in this way, the first two equations are used to determine the lengths of such a triangle. Thus, calculating the spacing or distance between two pores means that the length of A is equal to (X1−X2) and the length of B is equal to (Y1−Y2), where X and Y are the coordinates of respective first and second pores.

Thus, the measured porosity of FIG. 3 of the twenty six data points of the as-polished plane of FIG. 4 leads (through the algorithm above) to the calculated pore spacings of FIG. 5, presently shown in μm-based dimensions. Thus, the units indicated from left to right in the columns shown in FIG. 5 are as follows: area, length (which is the largest of sixty four measured Ferets), sphericity (determined by 4π times the area divided by the square of the perimeter, where the perimeter is the length of the boundary or perimeter of the pore), radius (i.e., that of a circle with the same area as the feature) and the four pore spacings (pore-to-pore, centroid-to-centroid, pore-to-surface and the distance-to-surface). Although not shown, the x', y' and z values correspond to the coordinates of each individual pore with an origin at the cast thermocouple surface in a Cartesian coordinate system.

After the results of FIG. 5 are determined, the pores must be grouped into various clusters as a way to enable determination of the pore sizes, pore coordinates and pore spacings. These clusters—which were first introduced above—are useful in further quantifying the pores with regard to size and distribution the porosity by providing a total area for the pores that make up each respective cluster. By way of example, the first pore will be transferred into a group called C1 (cluster 1) and labeled C1-1; this pore will then be triangulated with the remaining pores such that any pore within five SDAS of this first pore will be transferred into group C1 and labeled accordingly (for example, C1-2, C1-3, C1-4 up to C1-X). The second pore in group C1 (C1-2) will be triangulated with the remaining pores and any pores within a predetermined distance of this pore will be transferred into group C1 and labeled C1-(X+1), C1-(X+2), C1-(X+3) up to C1-Y. The third pore in group C1 (C1-3) will be triangulated with the remaining pores such that any pores within a predetermined distance of this pore will be transferred into group C1 and labeled C1-(Y+1). This is continued in this manner until the pores in group C1 are exhausted.

The first pore of the remaining pores from the image will then be transferred into a group called C2 (cluster 2) and labeled C2-1; this pore will then be triangulated with the remaining pores and any pore within 5 SDAS will be transferred into group C2 and labeled C2-2, C2-3, C2-4 . . . C2-X. The second pore in group C2 (C2-2) will be triangulated with the remaining pores and any pores within a predetermined distance of this pore will be transferred into group C2 and labeled C2-(X+1), C2-(X+2), C2-(X+3) up to C2-Y. The third pore in group C2 (C2-3) will be triangulated with the remaining pores and any pores within a predetermined distance of this pore will be transferred into group C2 and labeled C2-(Y+1). As with the group C1 above, this is continued until the pores in group C2 are exhausted.

This process is repeated for the remaining pores that have yet to be grouped. Thus, the first pore of the remaining pores that have not been grouped into either of cluster 1 (C1) or cluster 2 (C2) will then be transferred into a group called C3 (cluster 3) and labeled C3-1; this pore will then be triangulated with the remaining pores and any pore within 5 SDAS of this pore will be transferred into group C3 and labeled C3-2, C3-3, C3-4 . . . C3-X. The second pore in group C3 (C3-2) will be triangulated with the remaining pores and any pores within a predetermined distance of this pore will be transferred into group C3 and labeled C3-(X+1), C3-(X+2), C3-(X+3) up to C3-Y. The third pore in group C3 (C3-3) will be triangulated with the remaining pores and any pores within a predetermined distance of this pore will be transferred into group C3 and labeled C3-(Y+1). As with the groups discussed above, this is continue in this manner until the pores in group C3 are exhausted.

This is continued until the pores C1, C2, C3 . . . CX in the main group are exhausted. Note that if no pores are within 5 SDAS of the first pore in the cluster, that cluster will consist of one pore. The pores in each of these groups or clusters will then be triangulated to each other with the largest distance between pores to be accepted as the largest Feret diameter of the cluster. The absolute value of the smallest y-axis coordinate will be accepted as the distance to the surface (with the assumption of the origin as the surface). The total area of the pores in each cluster will be accepted as the pore size (area) of the cluster. The average of the y-axis coordinates within each cluster will be accepted as the y-axis coordinate of that cluster. The average of the x-axis coordinates within each cluster will be accepted as the x-axis coordinate of that cluster. Each of the clusters will then be triangulated to each of the other clusters with the smallest distance determining the nearest neighbor. Thus, once the clusters have been established, the maximum lengths of individual clusters are very close to the pore sizes observed in actual 3D space; these have been verified by comparing them to fractographic observations in an SEM.

As mentioned above, the various steps above may be automated to run on a machine executable program to create an output file/folder of the data to be analyzed. Upon generation of this output data, the stage is oriented to get the proper X and Y coordinates, keeping in mind that the absolute value of the Y coordinate is the distance from the surface, so the master origin must reflect this. Thus, by defining the origin of the sample, the relative locations of pores in the sample can be determined by IA automatically during its measurement. For example, the X direction at the origin of the surface from which the measurement is taken may be used in conjunction with a mosaic porosity program that searches for bitplane measurements. Such a program (which may form a part of the machine executable program discussed above) is used to reconcile pores that are located in multiple view fields. In an optical microscope or related device that is coupled to (or a part of) the IA, each view or measurement field (typically in the form of a square window) can only see so much, and since a pore can be located in the boundaries of multiple views, the IA will (absent the mosaic property program) only measure pores seen in a single view field. For pores partially located in other view fields, the measured size in a single view field will necessarily be smaller than the size of the pore even in 2D (as well as in 3D). The technique used by the mosaic porosity program juxtaposes several view fields and combines them into one single view field. This reduces the chance of pores being split in multiple view fields, thereby increasing measurement accuracy. It will be appreciated by those skilled in the art that other programs configured to perform a substantially similar operation may use different bitplanes for the measurements. In one form, the program may be run on one field of view with one pore in a corner, and then made sure to have the data reflect this particular field of view. It will be appreciated by those skilled in the art that mosaic images require large amounts of memory, and that manipulation of data corresponding to these images may therefore consume considerable computational resources.

Figure 6A:
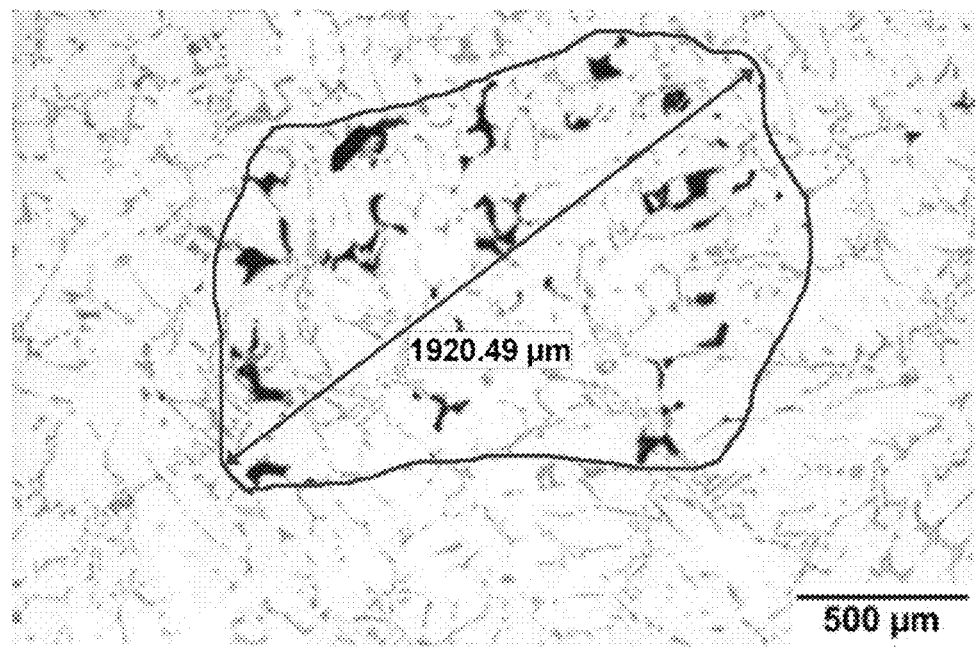
FIG. 6A (attached) shows criteria for grouping clustered pores according to an aspect of the present invention.
Figure 6B:
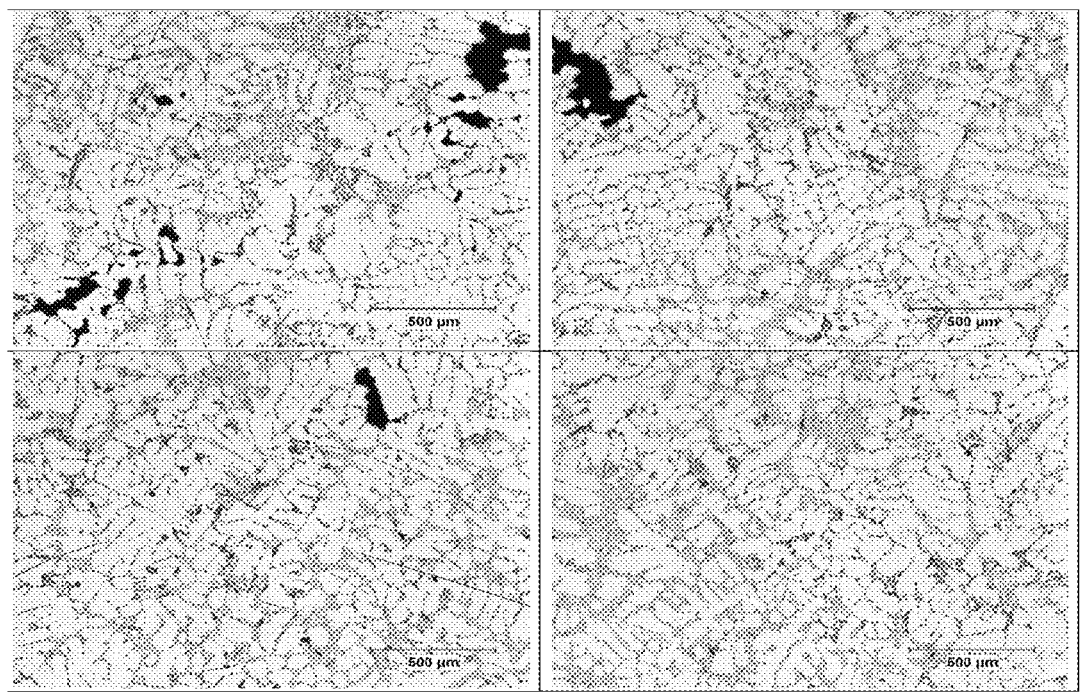
FIG. 6B shows a mosaic image depicting four individual fields using traditional (i.e., prior art) measurement and analysis techniques.

Referring next to FIGS. 6A through 6D, a comparison of the method of metallographically measuring pore sizes and pore distributions in a low pressure casting of an aluminum 319 sample according to the prior art and an aspect of the present invention is shown. FIG. 6A shows with particularity the criteria used for grouping clustered pores, where the interspacing between any two pores in the cluster is less than 5 SDAS, while the maximum pore size is depicted as a diagonal across the cluster. FIG. 6B shows a mosaic of four 2-by-2 individual fields of view at a magnification factor of 50 according to the prior art, where twenty seven pores were measured, showing a maximum pore size is about 490 micrometers (μm). Each of the twenty seven pore sizes were 328.70, 30.76, 76.41, 69.54, 165.41, 36.49, 51.37, 77.23, 60.05, 89.50, 57.76, 106.02, 88.19, 43.19, 58.25, 42.38, 45.81, 318.06, 107.82, 58.57, 142.02, 57.10, 489.53, 31.90, 295.81, 46.30 and 78.37 μm, respectively.

Figure 6C:
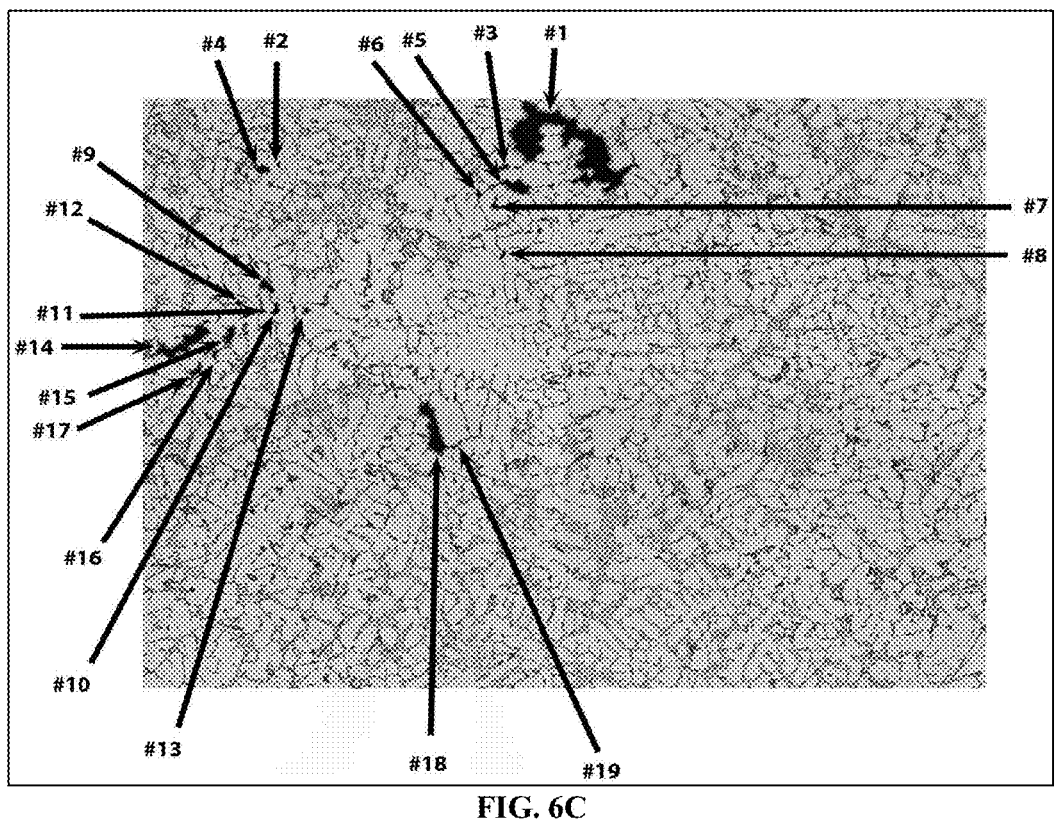
FIG. 6C shows a mosaic image of the same four fields as in FIG. 6B with individual pores identified according to an aspect of the present invention.

Referring with particularity to FIG. 6C, the same four individual fields from FIG. 6B are shown with nineteen of the individual pores identified according to an aspect of the present invention, where now the maximum pore size is about 660 μm. In particular, each of the nineteen pores identified have lengths of 662.79, 30.76, 66.26, 75.43, 163.94, 48.76, 71.50, 59.23, 86.22, 102.26, 84.10, 38.12, 37.47, 313.48, 101.93, 58.08, 138.25, 294.83 and 35.18 μm, respectively. Significantly, by using the mosaic porosity program discussed above, it is possible to take large mosaic images for pore size measurement, thereby avoiding the problem of a single pore being partially measured in multiple fields when it is located in boundaries of numerous fields.

Figure 6D:
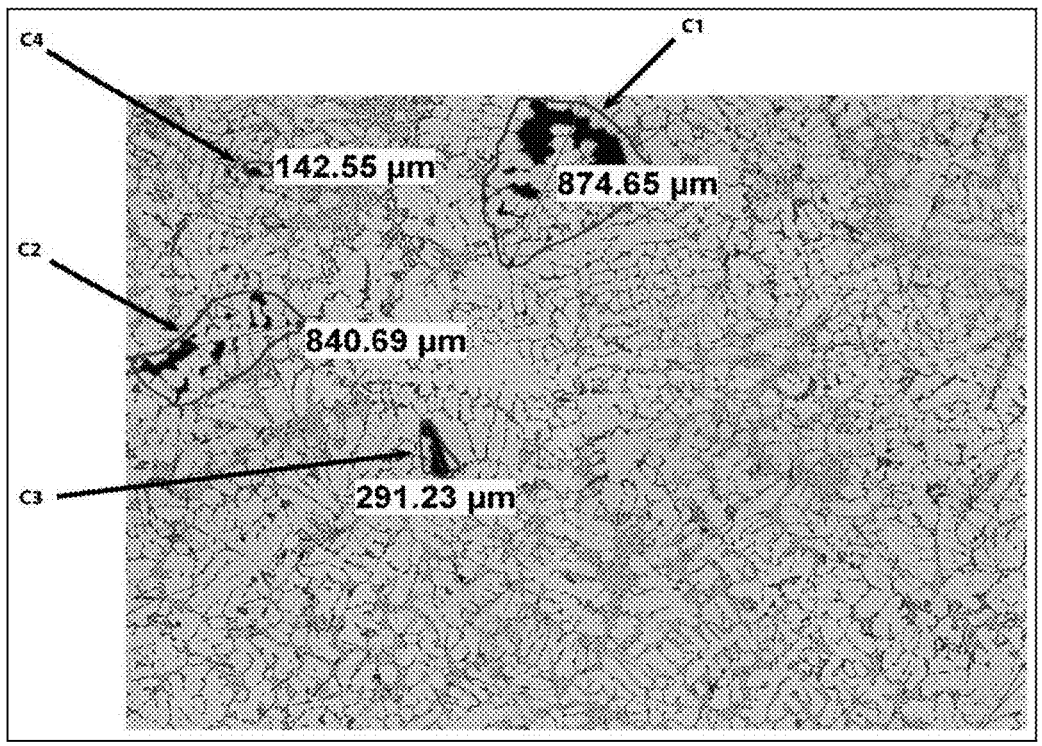
FIG. 6D shows a mosaic image of four pore clusters identified from the image shown in FIG. 6C.

Referring with particularity to FIG. 6D, four clusters of pores are identified according to an aspect of the present invention. As discussed above, the pores of a representative cluster are within 5 SDAS of each other. Assuming an SDAS of 56.1 μm, a 5× factor becomes 280.5 μm. Based on this, the four identified clusters have lengths of 874.65 μm, 840.69 μm, 291.23 μm and 142.55 μm, respectively. These measurements align more closely with the actual pore sizes and distributions than do the approaches used in the traditional analysis of FIG. 6B. The present inventors compared the sizes measured using the technique disclosed herein with fractographic measurements using SEM (which provides a very close approximation to actual 3D space) for the same location of the casting and found very close agreement. For example, the cluster C1 shown in FIG. 6D was determined by fractographic measurement to have a pore size of about 850 μm, which is in close agreement to the value of 874.65 μm as determined by the approach used in the present invention.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Moreover, the term "substantially" is utilized herein to represent the inherent degree of uncertainty that may be attributed to any quantitative comparison, value, measurement, or other representation. As such, it may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of determining pore size and distribution in a metal casting, said method comprising:
    providing a computer-based image analysis system comprising an input, an output, a processor, memory and program code comprising at least one algorithm configured to calculate pore spacings comprising at least one of pore-to-pore spacing, pore-to-surface spacing, distance-to-surface spacing and centroid-to-centroid spacing;
    receiving into said system an image corresponding to a location of interest in a sample of said metal casting;
    measuring with said system at least one of a porosity volume percent and pore size for a plurality of pores within said image;
    spatially defining with said system reference-frame coordinates corresponding to a relative position of each of said plurality of pores within said image;
    operating said processor in conjunction with said at least one algorithm to calculate said pore spacings based on said spatially-defined coordinates; and
    grouping said measured pore sizes and pore spacings into clusters based on an interpore secondary dendrite arm spacing of fewer than five secondary dendrite arm spacing units apart such that a measurement produced for at least one of said pore size and said pore distribution within said received image is correlated to at least one of an actual porosity volume percent and pore size within said sample.

2. The method of claim 1, wherein said operation of said processor to calculate comprises using the following equations:

$$A^2 + B^2 = C^2;$$

$$\sqrt{(A^2 + B^2)} = C$$

$$A = X_1 - X_2$$

$$B = Y_1 - Y_2; \text{ and}$$

$$\sqrt{[(X_1 - X_2)^2 + (Y_1 - Y_2)^2]} = C$$

to determine at least one of said pore spacings, where A and B represent triangulation factors, X and Y represent planar coordinates of a corresponding pore within a particular reference frame and C equals the centroid-to-centroid pore spacing.

3. The method of claim 2, wherein said reference-frame coordinates are defined in a Cartesian coordinate system.

4. The method of claim 1, further comprising using a mosaic porosity routine in conjunction with said at least one algorithm in order to more accurately portray pores within said sample that span across more than one image field of view.

5. The method of claim 1, wherein pores are determined to be clustered together when their interpore spacing is less than two secondary dendrite arm spacing units apart.

* * * * *